United States Patent
Son et al.

(10) Patent No.: US 9,288,610 B2
(45) Date of Patent: Mar. 15, 2016

(54) METHOD FOR CHANGING USER-ORIGINATING INFORMATION THROUGH INTERACTION WITH OTHER USER

(71) Applicant: BK Company Ltd., Gyeonggi-do (KR)

(72) Inventors: Byoung Chan Son, Seoul (KR); Byeong Ho Na, Gyeonggi-do (KR)

(73) Assignee: BK COMPANY LTD., Gyeonggi-Do (KR)

( * ) Notice: Subject to any disclaimer, the term of this patent is extended or adjusted under 35 U.S.C. 154(b) by 0 days.

(21) Appl. No.: 14/485,450

(22) Filed: Sep. 12, 2014

(65) Prior Publication Data

US 2015/0078296 A1   Mar. 19, 2015

(30) Foreign Application Priority Data

Sep. 13, 2013   (KR) .......................... 10-2013-0110727

(51) Int. Cl.
 *H04W 4/00* (2009.01)
 *H04M 1/725* (2006.01)
 *G06Q 50/00* (2012.01)
 *H04M 1/2745* (2006.01)

(52) U.S. Cl.
 CPC ............... *H04W 4/005* (2013.01); *G06Q 50/01* (2013.01); *H04M 1/72522* (2013.01); *H04M 1/274516* (2013.01); *H04M 1/7253* (2013.01); *H04M 2250/22* (2013.01)

(58) Field of Classification Search
 None
 See application file for complete search history.

(56) References Cited

U.S. PATENT DOCUMENTS

| | | | |
|---|---|---|---|
| 2012/0178369 A1* | 7/2012 | Kim .............................. | 455/41.2 |
| 2013/0060708 A1* | 3/2013 | Oskolkov et al. ............... | 705/75 |
| 2013/0169571 A1* | 7/2013 | Gai et al. ....................... | 345/173 |
| 2013/0219303 A1* | 8/2013 | Eriksson et al. ............... | 715/759 |
| 2013/0232197 A1* | 9/2013 | Shin et al. ..................... | 709/204 |

FOREIGN PATENT DOCUMENTS

| | | |
|---|---|---|
| KR | 1020130033485 A | 4/2013 |
| KR | 10-1494894 B1 | 2/2015 |

* cited by examiner

*Primary Examiner* — Zewdu A Beyen
(74) *Attorney, Agent, or Firm* — Stein IP, LLC

(57) ABSTRACT

A method for automatically changing information originating from at least either of a first user and a second user by using a mobile device includes steps of: (a) a first device searching second devices as a target to perform interaction and then selecting a specific second device among the searched second device to change the user-originating information; (b) the first device transmitting to, or receiving from, the specific second device data related to the interaction, if a touch gesture is detected in the first device; and (c) at least either of the first and the second devices allowing a server to update the information originating from at least either of the first user and the second user by referring to the transmitted data related to the specific interaction.

19 Claims, 7 Drawing Sheets

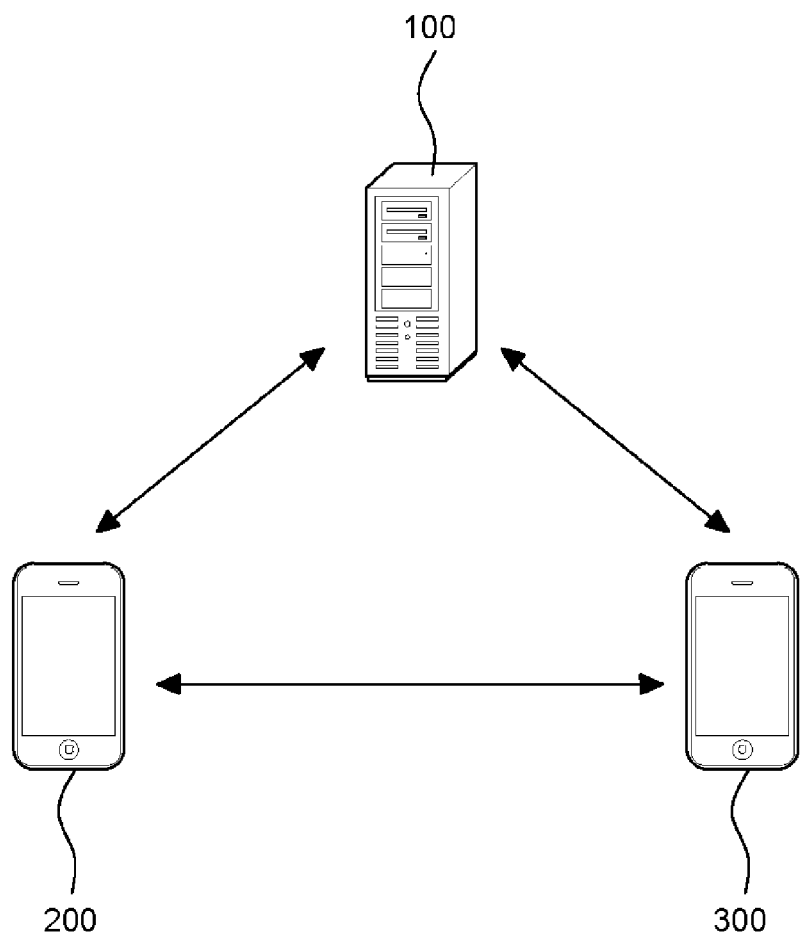

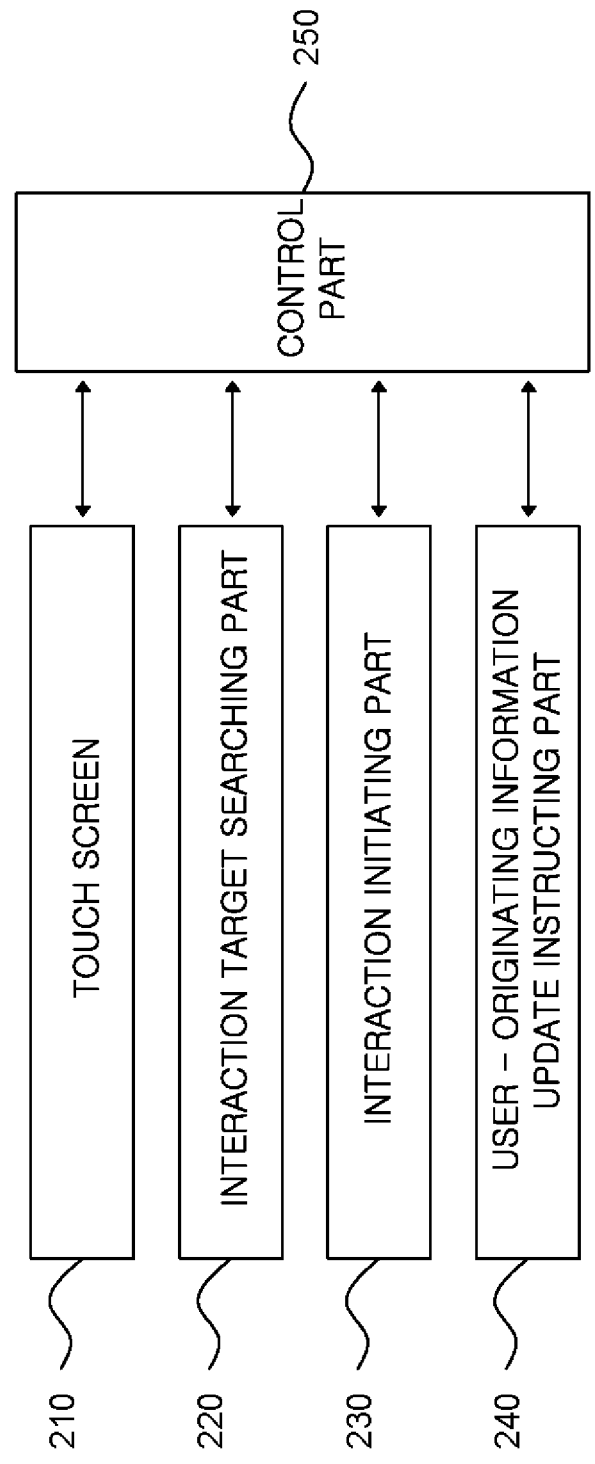

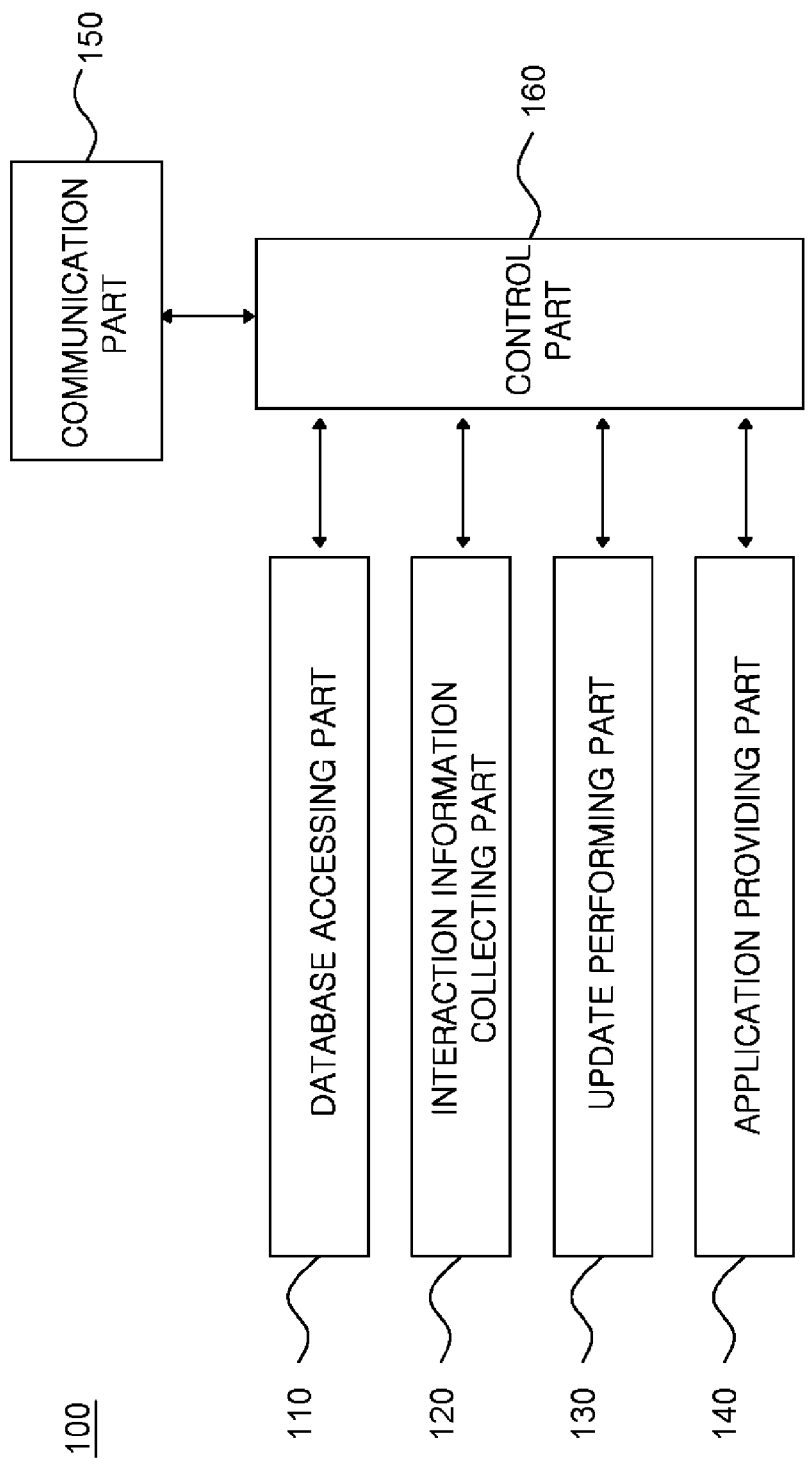

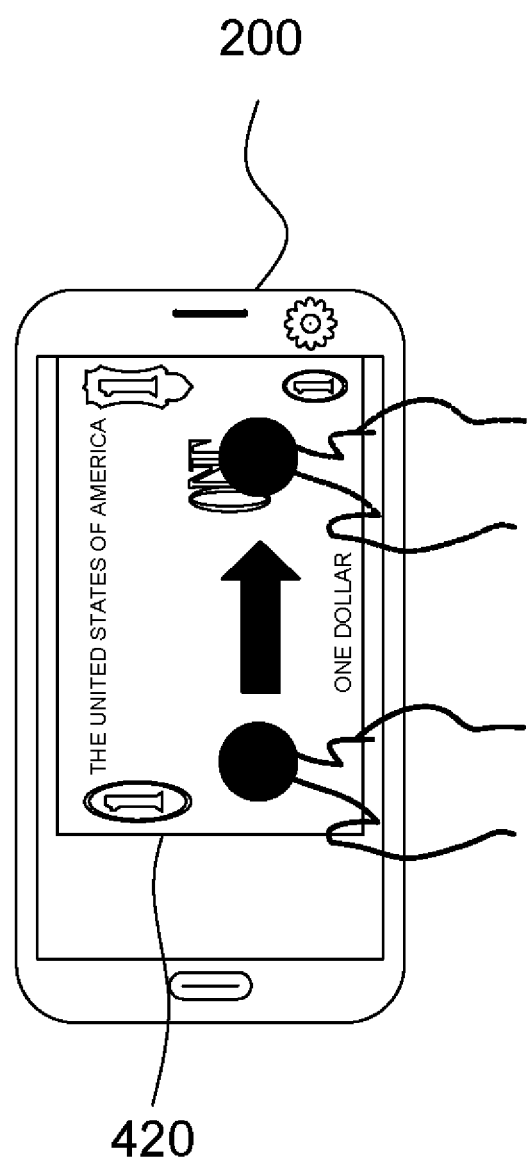

METHOD FOR CHANGING USER-ORIGINATING INFORMATION THROUGH INTERACTION WITH OTHER USER

CROSS REFERENCE TO RELATED APPLICATION

This application claims priority to and incorporates herein by reference all disclosure in Korean Patent Application No. 10-2013-0110727 filed Sep. 13, 2013.

FIELD OF THE INVENTION

The present invention relates to a method for changing user-originating information through interactions with other users; and more particularly, to the method for changing user-originating information by searching a second mobile device of a second user as a target for performing a specific interaction with a first user of a first mobile device within a predetermined distance from the location of the first mobile device, transmitting to, or receiving from, the second mobile device data related to a specific interaction if a specified touch gesture is detected by the first mobile device, and allowing a server to update the information originating from at least either of the first and the second users.

BACKGROUND OF THE INVENTION

Recently as smart devices have been widely used, users of the smart devices increasingly perform interactions through the smart devices. Smart device users perform interactions, including giving or receiving gifts with others or carrying out financial transactions, by using smart devices.

In particular, building relationships with others or growing personal connections in social networks may be held up as an example of interactions that may be performed by using such smart devices. To build relationships with others and grow personal connections in social networks, users of social network service (SNS) need to send so-called "friend requests" to others. To do so, they have to perform a cumbersome procedure. For example, they have to search a name (or nickname) of other person whom they want to build relationships with, click or touch a button, send a message of friend request to the person and then wait for the person's acceptance. However, it is difficult for users who are not familiar with SNS to perform such procedure. Accordingly, the development of technologies that may solve such problems and perform simple and intuitive interactions is required.

SUMMARY OF THE INVENTION

It is an object of the present invention to solve all the problems mentioned above.

It is another object of the present invention to easily search a mobile device of the other person to perform an interaction with a user's mobile device without any complicated procedure.

It is still another object of the present invention to update user-originating information relating to the other person only with simple user interface very easily by updating the user-originating information recorded in a server or a database interacted with the server if a gesture of the user's swiping gesture to an image displayed on the mobile device is detected as a specified touch gesture.

It is still yet another object of the present invention to omit cumbersome procedures including the user's finding the other user under the name of the other user on the SNS, selecting the other person among searched different persons with the same name, sending a friend request, etc. and allow an interaction to be intuitively performed because the interaction is available as long as the application installed in the mobile devices of the user and the other user is turned on.

It is still yet another object of the present invention to allow the interaction between mobile devices to be available as long as an application installed in the mobile devices is turned on, if a financial transaction between the user and the other user is carried out, and allow the financial transaction to be carried out just with a simple swipe gesture (even though both mobile devices are not physically contacted or nearly contacted with each other).

In accordance with one aspect of the present invention, there is provided a method for automatically changing information originating from at least either of a first user and a second user by using a mobile device, including steps of: (a) a first mobile device of the first user searching at least one second mobile device of at least one second user as a target to perform a specific interaction within a predetermined distance therefrom or searching at least one second mobile device connected to an AP, an ad-hoc network, or a base station of a cellular network to which the first mobile device is connected and then selecting at least one specific second mobile device among the searched at least one second mobile device to change the user-originating information; (b) the first mobile device transmitting to, or receiving from, the specific second mobile device data related to a specific interaction, if a specified touch gesture is detected in the first mobile device; and (c) at least either of the first and the second mobile devices allowing a server to update the information originating from at least either of the first user and the second user stored in the server or a storage device interacted with the server by referring to the transmitted data related to the specific interaction.

BRIEF DESCRIPTION OF THE DRAWINGS

The above and other objects and features of the present invention will become apparent from the following description of preferred embodiments given in conjunction with the accompanying drawings, in which:

FIG. 1 is a drawing illustrating the brief configuration of the whole system to change information originating from at least either of a first user and a second user by using a mobile device through an interaction with others in accordance with an example embodiment of the present invention.

FIG. 2 is a drawing showing the internal configuration of the mobile device in accordance with one example embodiment of the present invention.

FIG. 3 is a drawing representing the internal configuration of a server to change user-originating information on at least either of the first user and the second user with the support of a first mobile device of the first user and a second device of the second user in accordance with an example embodiment of the present invention.

FIGS. 5A and 5B are exemplary drawings to explain the performance of the interaction between the user and the other user in accordance with a second example embodiment of the present invention.

DETAILED DESCRIPTION OF THE PREFERRED EMBODIMENTS

Figure 4A:
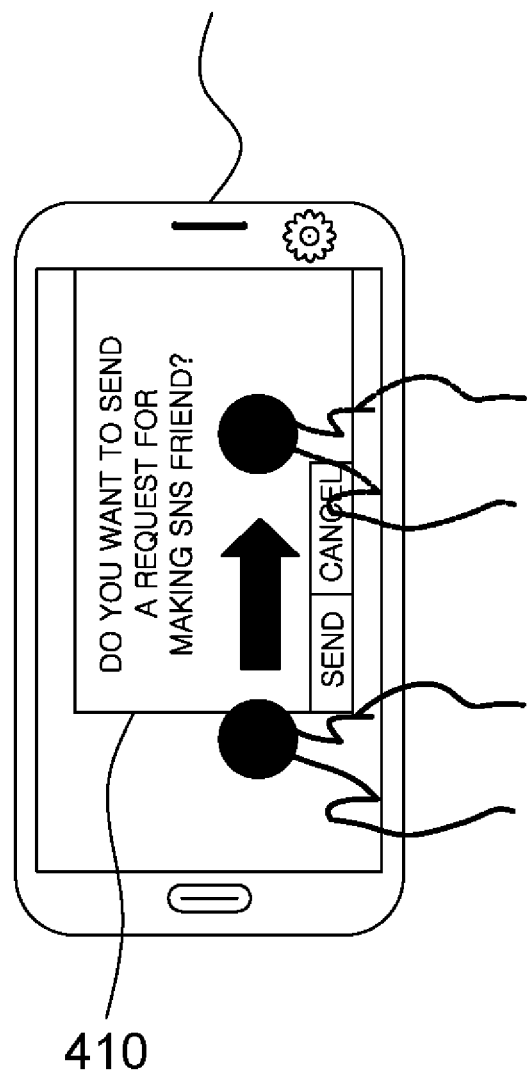
FIGS. 4A and 4B are exemplary drawings to explain the performance of the interaction between a user and the other user in accordance with a first example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Whole System

FIG. 1 illustrates the brief configuration of the whole system to automatically change information originating from at least either of a first user and a second user by using mobile devices in accordance with an example embodiment of the present invention. The "information originating form a user" or "user-originating information" will be explained later.

As illustrated in FIG. 1, the whole system in accordance with an example embodiment of the present invention may include a server 100, a communication network (non-illustrated), the first user's first mobile device 200 and the second user's second mobile device 300. For reference, the first user and the second user may be described as the terms "a user" and "the other user", respectively, herein.

First of all, the communication network may be implemented to either wired or wireless network. The communication network may include a wide area network (WAN), a local area network (LAN), a telecommunication network, an artificial satellite communication network, and other diverse networks. More preferably, the communication network may be wireless communication networks implemented by technologies such as IEEE 802.11, Code Division Multiple Access (CDMA), Wideband Code Division Multiple Access (WCDMA), Global System for Mobile communications (GSM), and Long Term Evolution (LTE). However, the communication network may also include at least part of a publicly known wired and wireless data communication network, a publicly known telephone network, or publicly known wired and wireless television networks without being limited only to these.

Next, the server 100 may receive data related to an interaction to be performed between the first user as owner of the first mobile device 200 and the second user as owner of the second mobile device 300 from at least either of the first mobile device 200 and the second mobile device 300 through the communication network. By referring to the data related to the interaction, it may update information originating from the first user or the second user stored in a database (non-illustrated).

Herein, the user-originating information may include information on lists of Social Network Service (SNS) friends, financial account balances or transactions, address books, coupons, etc. of the first user and the second user.

Lastly, the first mobile device 200 and the second mobile device 300 may be digital devices which are capable of communicating between the first mobile device 200 and the second mobile device 300 and/or accessing the server 100 and then communicating with it. Such digital devices, may include a mobile phone (particularly, smart phone), a tablet PC, a laptop, etc., with touch panels.

The detailed explanation on configurations and functions of the mobile devices 200 and 300 and the server 100 will be made.

Configurations of Mobile Devices of the Users

Internal configurations of the mobile devices in accordance with the present invention and functions of their components will be explained.

FIG. 2 is a drawing showing the internal configuration of the mobile device of the user (i.e., the first user) which performs a specific interaction with that of the other user (i.e., the second user) to change information originating from the user or the other user who has a relationship with the user.

As illustrated in FIG. 2, the mobile device 200 may be configured, including a touch screen 210, an interaction target searching part 220, an interaction initiating part 230, a user-originating information update instructing part 240, a communication part (non-illustrated), and a control part 250.

First, the touch screen 210 may perform a function of receiving a touch gesture from the user. The touch screen 210 reads a touch position of the user. The control part 250 may determine a type of touch gesture, e.g., tap, long-press, drag, or swipe gestures, by using the read touch position. An interaction between the user's mobile device 200 and the other user's mobile device 300 may be performed depending on a position or a type of the entered touch gesture.

Next, the interaction target searching part 220 may perform a function of searching the other user's mobile device 300 as a target for the specific interaction with the user's mobile device 200 within a predetermined distance from the location of user's mobile device by using a variety of location determination technologies including global positioning system (GPS), Wi-Fi Positioning System (WPS), or Cell ID (CID).

In this case, if the user (i.e., the first user) turns on a certain application program in his or her mobile device while same kind of application programs to the certain application program are run under the background state (or foreground state) in respective mobile devices of the other users (i.e., the second users) and regularly transmit the respective locations of the mobile devices of the other users to the server 100, the information on the other users around the first user will be collected and transmitted to the user's mobile device by the server 100. After that, if the user selects at least one of the second users, a message may be allowed to be pushed to the selected second user's mobile device and if the selected second user selects (e.g., clicks) the message through the touch screen of his or her mobile device, the application program in the selected second user's mobile device may be automatically executed and then the first user's mobile device and the selected second user's one may be at a communicable state. If there is any second user's mobile device whose application is turned on (i.e., awake from the background state) among the second users' mobile devices, the first and the second user's mobile devices may be automatically communicable without any transmission of the pushed message.

Besides, the interaction target searching part 220 may perform a function of searching second users' devices connected to a local area network, i.e., an AP or Wi-Fi ad-hoc network which the first user's mobile device has accessed. In case of the local network using AP or the network using the Wi-Fi ad-hoc mode, the first user's mobile device 200 may transmit a query inquiring whether an application program in accordance with the present invention is installed to all the second users' mobile devices connected to the AP or the ad-hoc network in a form of multicast or broadcast. Among the second users' mobile devices connected to the AP or the ad-hoc network, one or more second users' mobile devices where the application program is installed or running may transmit information on whether installed or not with information on the respective second mobile devices by responding to the query. This example embodiment was explained on assumption that whether the application program is installed or not is inquired as a query, but it is not limited to this. For example, the user's mobile device 200 may inquire general information on the other user's mobile device 300 (e.g., "who are you," etc.) as a query, and may also receive information on identifiers (e.g., mobile phone number, UUID, etc.), IP address, MAC address, or possible financial transactions of the mobile device, whether to install and/or run an application for financial transactions, etc. as a response thereto.

In addition, the interaction target searching part 220 may search the other user's mobile device 300 which may be directly connected wirelessly with the user's mobile device 200 through Bluetooth, Wi-FI Direct, etc. For instance, in case of direct wireless connection between mobile devices through Bluetooth, Wi-Fi Direct, etc., the user's mobile device 200 may know whether it could be directly connected with neighbor mobile devices within a predetermined distance, e.g., signal transmission coverage, and whether the application program in accordance with the present invention has been installed therein. For example, if the user's mobile device 200 searches the other users' mobile devices 300 with which the user's mobile device 200 can directly connect wirelessly around itself, the searched mobile devices 300 may provide information on the ID thereof and available service information, e.g., information on whether the application program is installed, for the user's mobile device 200. The user's mobile device 200 may select a specific second user's mobile device 300 to interact with among the searched mobile devices 300 by using the provided information on the ID and the available service information. Even if direct connection between devices is implemented in the fifth-generation (5G) mobile communication in the future, it is made clear that the present invention may be implemented through the 5G mobile communication.

More preferably, if there are multiple mobile devices 300 searched to have the installed application program in accordance with the present invention therein (or searched based on particular information received as a response to the query) through the interaction target searching part 220, the user's mobile device 200 may automatically select a certain mobile device where the application program is turned on among the searched mobile devices to perform an interaction with the certain mobile device. In other words, without going through separate connection/approval procedures for the wireless connection between both mobile devices, as long as each application installed in both the first user's and the second user's mobile devices is turned on, the both mobile devices are at the wirelessly connectible state. In this case, user convenience is improved because the probability of unnecessarily interacting with the other user's mobile device 300 which does not want to communicate, i.e., the mobile device 300 where the application is not turned on, is reduced. The interaction target searching part 220 may determine whether the application is turned on by acquiring the signal transmitted by the application. At the time, the application program may be a program to perform the specific interaction.

It is noted that the interaction target searching part 220 could also be implemented to provide a list including information on the at least one specific second user's mobile device to perform interactions to the first user's mobile device even if the application program is installed but is not turned on in the at least one specific second user's mobile device.

If there are multiple second users' mobile devices where the application programs in accordance with the present invention are turned on among the searched second users' mobile devices, the interaction target searching part 220 may allow the list of the second users' mobile devices in which the application programs in accordance with the present invention are turned on to be displayed on the first user's mobile device 200. In this case, the user may select a target to perform the specific interaction with among the second users' mobile devices whose information is displayed on the first user's mobile device 200 to thereby establish a connection with the target. If there is only one second user's mobile device in which the application is turned on, the first user's mobile device could select the second user's one automatically as a target for interaction without any entry of the user, of course.

At the time, the interaction target searching part 220 may also allow information on the target, i.e., the selected the other user's mobile device 300, to be displayed on the user's mobile device 200 to make the user check whether the other user's mobile device 300 selected as specified above is the appropriate target to perform the interaction.

More desirably, the user's mobile device 200 may turn on the capability of transmitting and receiving a wireless signal together with turning on the application program in accordance with the present invention to enable the search function of the interaction target searching part 220.

Next, if the specified touch gesture of the user is detected through the touch screen 210 and the control part 250, the interaction initiating part 230 may perform a function of transmitting or receiving data related to the specific interaction to or from the other user's mobile device 300 searched and selected by the interaction target searching part 220. The data related to the specific interaction may play a role as a triggering signal for triggering a change of the information originating from the user or the other user. And the data related to the specific interaction may include (i) data immediately required to change the information originating from the user or the other user (so-called "actual data") such as data on the SNS account of the user or the other user, financial account information (account number, balance and the like), or transaction amount, or (ii) a signal for simply declaring an intention, which is not the actual data (e.g., instruction defined between the mobile devices). Detailed explanation of (i) actual data to change the information originating from the user or the other user, or (ii) the signal for simply declaring the intention that could be included in the data related to the specific interaction will be given.

The specific interaction may be at least one of interactions for making a SNS friend, performing a financial transaction, giving and receiving contact numbers, and giving a coupon as a gift and proper data could be transmitted or received depending on types of interactions, i.e., types of the user-originating information to change.

More specifically, in accordance with a first example embodiment of the present invention, the user may perform the interaction to make SNS friends with the other user. In this case, if a specified touch gesture is detected, information on the SNS account of the user or the other user (i.e., the actual data), as data related to the specific interaction, may be transmitted. It is noted that information may be not on the SNS account of the user or the other user. In this case, the signal for simply declaring the intention to update the information on the list of SNS friends could be transmitted as data. The signal for simply declaring the intention could be just the declaration of the intention of "wanting to interact" of the user or the other user and just the entry of a specified touch gesture through the mobile device of the user or the other user could be treated to be the entry of such a signal for simply declaring the intention. By referring to the data related to the specific interaction, the user-originating information update instructing part 240 to be explained below may instruct the server 100 to update the information originating from the user or the other user. Even though information on a certain SNS where the user wants to be SNS friends with the other user among multiple SNS such as facebook, twitter, and Linkedin and information on the SNS accounts of the first user and the second user is not transmitted between the user's mobile device 200 and the other user's mobile device 300, if the signal for simply declaring the intention to update the list of SNS friends is transmitted as the data related to the specific interaction, the server 100 may be instructed to update the list of SNS friends by receiving the information on the certain SNS where the user wants to be SNS friends with the other user among the multiple SNS and the information on the SNS accounts of the first user and the second user from the mobile devices 200 and 300 of the user and the other user.

The user may interact with the other user for a financial transaction. In this case, if a specified touch gesture is detected, the actual data such as transaction amounts, and financial account information of the user or the other user as the data related to the specific interaction may be transmitted between the user's mobile device and the other user's. Of course, only the signal for simply declaring the intention of wanting the financial transaction might be transmitted as the data related to the specific interaction. If the signal for simply declaring the intention of wanting the financial transaction is transmitted, even though the data such as, transaction amount, financial account number of the user or the other user, balance, a type of institution supporting the financial transaction is not directly transmitted between the user's mobile device 200 and the other user's mobile device 300, the server 100 may be instructed to update the balance or transactions of the financial account of at least either of the user or the other user by receiving the actual data such as the transaction amount, the financial account number of the user or the other user, the balance, the type of institution supporting the financial transaction from the mobile devices 200 and 300 of the user and the other user.

In the past, a financial transaction by using a smart device was nothing but simply transferring money from a bank or insurance account of the user to the account of the other user. To perform this, it was necessary for the user to conduct the financial transaction through complicated procedures after logging in the bank account by using an application supported by the user's bank. In case of a digital wallet payment service by using the near field communication (NFC), it was difficult to search a mobile device which might perform the digital wallet service because the operable scope was very narrow and it was inconvenient to place a mobile device physically close to another mobile device. Besides, it was impossible to enjoy convenience of automatic connection between two mobile devices wherein the automatic connection is established as long as the application is turned on in both mobile devices. In accordance with the example embodiment of the present invention, the financial transaction between the user and the other user is available because they become wirelessly connected with each other as long as the application installed, respectively, in both mobile devices is turned on, even though both mobile devices are not physically contacted.

The user may perform an interaction for giving and receiving a contact number with the other user. At the time, if a specified touch gesture is detected to have been entered in the user's mobile device 200, information on a business card of at least either of the user or the other user as data related to the specific interaction (i.e., the actual data) may be transmitted or the signal for simply declaring the intention to update an address book may be transmitted.

Lastly, the user may perform an interaction for giving to, and receiving from, the other user a coupon. In this case, if a specified touch gesture is detected to have been entered in the user's mobile device 200, information on a type of coupon and information on the user or the other user as data related to the specific interaction (i.e., the actual data) may be also transmitted or the signal for simply declaring the intention to update coupon information may be transmitted.

The specified touch gesture as displayed on the user's mobile device 200 may be a gesture of swiping an image corresponding to the data related to the specific interaction to a first direction. Herein, the first direction may be a direction of taking a gesture of pulling the image out of the mobile device 200 but it is not limited to this.

Meanwhile, the image displayed on the user's mobile device 200 may depend on a type of interaction. For example, in case of an interaction for making a SNS friend, an image to be displayed may include the data related to the SNS account of the user (e.g., an image on which a profile photo, name, nickname, etc. of the user of the other user on the SNS or a business card-shaped image). In case of an interaction for conducting a financial transaction, the image may be a shape of bill. In case of giving and receiving a contact number, the image may be a shape of business card of the user of the other user. In case of an interaction for giving and receiving a coupon, it may be a coupon-shaped image. Herein the coupon-shaped image may include text information as the case may be.

In brief, if the user enters a gesture of swiping an image corresponding to the data related to the specific interaction to the first direction, the data defined above is transmitted to the other user's mobile device 300 and an image corresponding to the data may be displayed on the other user's mobile device 300. Herein, it was explained on assumption that the data is transmitted from the user's mobile device 200 to the other user's mobile device 300, but conversely the data could be transmitted from the other user's mobile device 300 to the user's mobile device 200.

The interaction initiating part 230 may perform a function of certifying a particular user. In the interaction for a financial transaction, security is important because the information originating from the user or the other user may be updated only with the signal for simply declaring the intention to update the information. Security may be enhanced by checking whether the touch gesture is made by the user himself or herself. At the time, the user may be certified by using a fingerprint recognition module. A fingerprint may be recognized by using a fingerprint recognition sensor embedded or attached in the mobile device and by using either of a swipe type sensor for swiping a finger on the fingerprint recognition sensor or an area type sensor for touching whole area of the finger at once. The touch gesture and fingerprint of the user may be recognized at the same time by using the touch panel of the mobile device as a fingerprint recognition module as well.

Next, the user-originating information update instructing part 240 may perform a function of instructing the server 100 to update information originating from at least either of the user and the other user stored therein or a storage device interacted therewith by referring to the data related to the specific interaction transmitted or received by the interaction initiating part 230. For reference, the information originating from the user and the other user stored in the server 100 or the storage device interacted therewith is explained to be identical to the information originating from the first and the second users stored in user-originating information database to be described later.

The user-originating information update instructing part 240 instructs the server 100 to update information originating from at least either of the user or the other user. And the server 100 may receive the data related to the specific interaction through an interaction information collecting part 120 which will be explained later and instruct the information originating from at least either of the user or the other user to be updated by referring to the received data.

More specifically, if a specified tough gesture is detected in the first mobile device 200 and the data related to the specific interaction is transmitted to the second mobile device 300, the interaction information collecting part 120 may receive data related to the specific interaction from the second mobile device 300. For example, in case of the interaction for making a SNS friend, information on a certain SNS where the user wants to be SNS friends with the other user among multiple SNS's such as facebook, twitter, and Linkedin and information on the SNS accounts of the first user and the second user may be included. Conversely, if the first mobile device 200 receives the data related to the specific interaction, the interaction information collecting part 120 may receive the data related to the specific interaction from the first mobile device 200. Besides, if the specified touch gesture is detected in the first mobile device 200 and the signal for simply declaring the intention is transmitted to the second mobile device 300 to update the user-originating information, the interaction information collecting part 120 may receive the data related to the specific interaction, respectively, from the first mobile device 200 and the second mobile device 300.

The user-originating information update instructing part 240 may instruct the information originating from the user or the other user to be updated when the specified touch gesture is detected in the user's mobile device 200 or when the specified touch gesture entered in the other user's mobile device 300 is detected as a signal of transmitting and receiving the data, as the case may be.

At the time, the touch gesture, detected as the signal of transmitting and receiving the data, inputted through the other user's mobile device 300 may be a gesture of swiping an image corresponding to the data related to the specific interaction to a second direction. The second direction may be a direction showing that the other user fully draws the image partially displayed on the mobile device 300 into the other user's own mobile device, but it is not limited to this. While the first direction intends to intuitively express that the images of "making a SNS friend", a bill, a business card, a coupon, etc. are transmitted to the other user, the second direction may be considered to intuitively express that the aforementioned images are received.

Further explanation will be made exemplarily by referring to FIGS. 4 and 5. FIGS. 4A and 4B are exemplary drawings to explain that the interaction between the user and the other user is performed in accordance with SNS example embodiment and FIGS. 5A and 5B are exemplary drawings to explain that the interaction between the user and the other user is performed in accordance with the financial example embodiment.

Figure 4B:
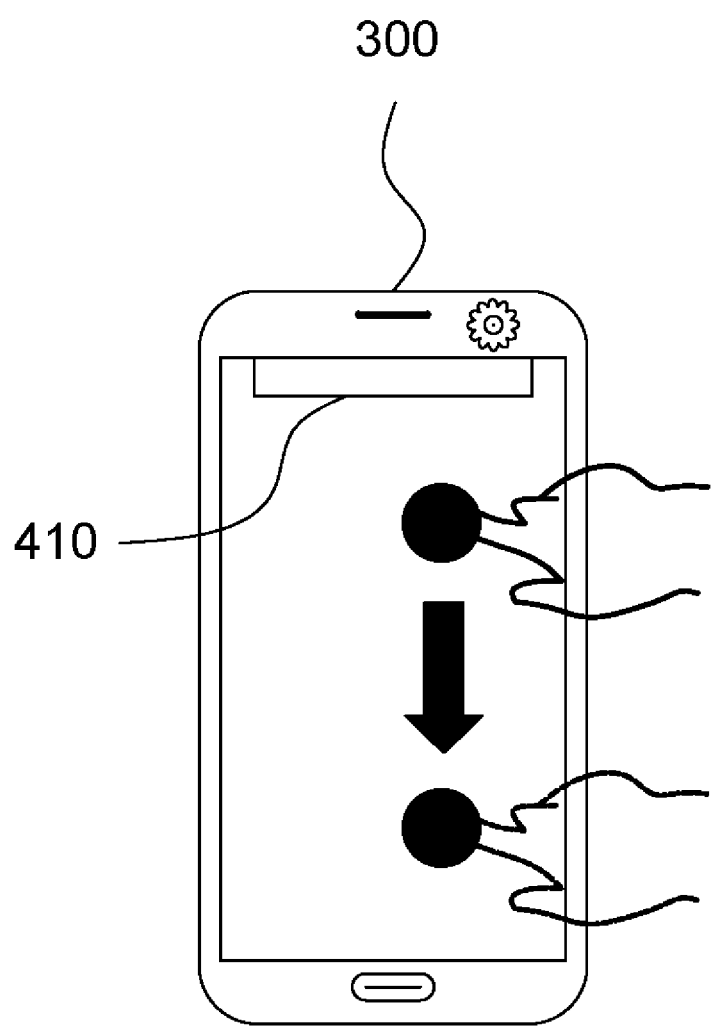

As illustrated in FIGS. 4A and 4B, the user and the other user may perform an interaction for making SNS friends though their mobile devices 200 and 300. As illustrated in FIG. 4A, an image 410 relating to a SNS friend request may be displayed on the user's mobile device 200. The image 410 may include a profile photo uploaded to the user's SNS account, the user's name or nickname on the SNS account, a message for a friend request, etc. If the user takes a gesture of swiping the image 410 to the arrow-direction illustrated in FIG. 4A as a specified gesture, the data related to the interaction for making the SNS friend is transmitted to the other user's mobile device 300 and the image 410 (or an image whose contents are somewhat changed from the image 410 according to a situation of the other user) relating to the SNS friend request may also be displayed in the other user's mobile device 300 as illustrated in FIG. 4B. If the other user takes a touch gesture of swiping the image displayed on the mobile device 300 to the arrow-direction illustrated in FIG. 4B, the server may be allowed to update lists of SNS friends of the user and the other user stored in the user-originating information database.

The effective application of example of SNS USE will be explained by using the situation in which the user and the other user happen to see each other after a long interval while walking as an example. Under the situation, the user and the other user could give and receive contact numbers such as telephone number, email address, or SNS account information after asking after each other. In general, to give and receive contact numbers, they had to pull out, and hand over, their business card containing their contact numbers, or have to tell or listen to their contact numbers and then store the contact numbers in their mobile devices. To be SNS friends on the SNS such as facebook, they, furthermore, had to go through the seriously cumbersome procedures, including logging on the SNS, finding a friend, sending a friend request, and allowing the friend to accept the request. In accordance with one example embodiment of the present invention, it, however, works with a very simple user interface because the user and the other user may become friends if they turn on the same SNS application and then the user takes a first swipe gesture through the user's own mobile device as if the user handed over the image to the other user the user faces and the other user takes a second swipe gesture through the other user's own mobile device as if the other user received the image. In other words, the cumbersome procedures, including the user finding the other user under the name of the other user on the SNS, selecting a certain user among searched different persons with the same name, sending a friend request, etc., may be omitted. Instead, the user may perform the interaction intuitively.

Meanwhile, it was explained in FIGS. 4A and 4B that the data related to the interaction for making the SNS friend is transmitted to the other user's mobile device, but the user's mobile device may receive the data related to the interaction for making the SNS friend from the other user's mobile device, of course.

Figure 5B:
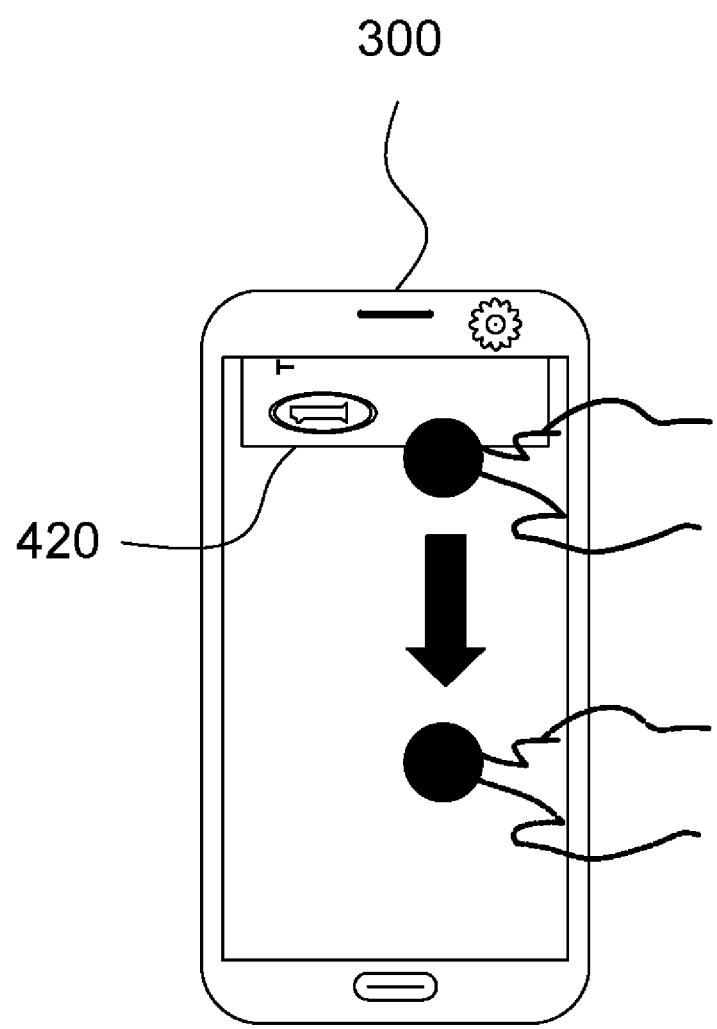

As illustrated in FIGS. 5A and 5B, the user and the other user may also perform an interaction for a financial transaction through their mobile devices 200 and 300. In this case, as illustrated in FIG. 5A, a bill-shaped image 420 may be displayed on the user's mobile device 200. If the user takes a touch gesture of swiping the bill-shaped image 420 in the arrow direction illustrated in FIG. 5A, the data related to the interaction for the financial transaction is transmitted to the other user's mobile device 300. It was explained in FIG. 5A on assumption that the data related to the interaction for the financial transaction was transmitted to the other user's mobile device, but as the case may be, the user's mobile device could receive the data. As illustrated in FIG. 5B, the image same as the bill-shaped image 420 (or an image whose contents are somewhat changed from the image 420 according to a situation of the other user) transmitted from the user's mobile device 200 to the other user's mobile device 300 may be displayed. If the other user takes a touch gesture of swiping the bill-shaped image 420 in the arrow direction illustrated in FIG. 5B, the server 100 may be allowed to update the balance or transactions of the financial accounts of the user and the other user stored in the user-originating information database. At the time, the image 420 may be in the same shape as the currently used money for the intuitive recognition of the user. For example, if the user intends to perform an interaction for transferring USD 15 to the other user, after swiping the 10-dollar bill shaped image, the user may take a touch gesture of swiping a 5-dollar bill shaped image. In other words, the balance or the transactions of the financial account are allowed to be updated based on a gesture of handing over the money, i.e., a gesture the user is accustomed to, so that a sense of difference which the user accustomed to transactions through money exchange might feel when the user conducts Internet banking may be reduced.

The effective application of the example of financial use will be explained by using the situation in which the user pays back the money the user borrowed from the other user as an example. First of all, (i) the user and the other user turn on the same financial transaction-related application program; (ii) the user selects a bill-shaped image from the user's digital wallet (i.e., the financial transaction-related application) and swipes it to the first direction as if handing over a bill to the other user; and (iii) the other user draws the bill displayed on the other user's mobile device to the second direction as if the other user received the bill handed over by the user. Therefore, it can work with a very simple user interface. Because the existing method (e.g., NFC method) requires a mobile device to be placed physically close to another mobile device due to a much narrower operable scope in comparison with the procedures of (i), (ii), and (iii) and it did not have a significant feature of the present invention, i.e., a feature that the mobile devices can be wirelessly connected when the digital wallet applications of both users are turned on and they can pay and repay money even though both mobile devices are not physically contacted, it causes a lot of inconvenience. In accordance with the present invention, it is possible to reduce a sense of difference from the real life by allowing procedures similar to actions taken in the real life, e.g., actions of the user pulling out from the wallet and handing over money to the other and the other receiving and putting the money in his or her own pocket, to be performed. Accordingly, it may be used without any trouble even by users who are not familiar with smart devices.

It was explained that the server 100 is instructed to update information originating from the user and the other user stored in the user-originating information database by referring to the data related to the specific interaction if a gesture of swiping an image by the other user in FIGS. 4A, 4B, 5A and 5B. However, as the case may be, if other touch gesture of the user is detected, the server 100 can be instructed to update based on the data as well.

How the information originating from at least either the user and the other user is updated through the server by the user-originating information update instructing part 240 will be found out through detailed explanation about the server 100 below.

Next, the communication part may perform a function of allowing data transmission and reception to/from the server 100 and the other user's mobile device 300.

Finally, the control part 250 may perform a function of controlling data flow among the touch screen 210, the interaction target searching part 220, the interaction initiating part 230, the user-originating information update instructing part 240, and the communication part. In other words, the control part 250 may control the flow of data from/to outside or among the components of the mobile device 200 and thereby allow the touch screen 210, the interaction target searching part 220, the interaction initiating part 230, the user-originating information update instructing part 240, and the communication part to perform their unique functions.

Configuration of the Server

The internal configuration of the server and functions of their components will be explained.

FIG. 3 is a drawing representing the internal configuration of the server to change at least either of the first user and the second user with the support of the first mobile device of the first user and the second device of the second user in accordance with an example embodiment of the present invention.

As illustrated in FIG. 3, the server 100 may be configured to include a database accessing part 110, an interaction information collecting part 120, an update performing part 130, an application providing part 140, a communication part 150, and a control part 160. At least some of the database accessing part 110, the interaction information collecting part 120, the update performing part 130, the application providing part 140, the communication part 150 and the control part 160 may be program modules communicating with the mobile devices 200 and 300. Such program modules may be included in the server in a form of an operating system, an application program module and other program modules or physically stored in various storage devices well known to those skilled in the art. In addition, they may be stored in a remote storage device capable of communicating with the server. The program modules may include but not be subject to a routine, a subroutine, a program, an object, a component, and a data structure for executing a specific operation or a type of specific abstract data that will be described.

First of all, the database accessing part 110 may perform a function of accessing the user-originating information database where information originating from the first and the second users is stored.

In the specification, the information originating from the first and the second users may be stored in the user-originating information database. In other words, information such as information on SNS accounts of the first and the second users, lists of friends in their respective SNS accounts, their financial account numbers, balance, address books (which are interacted between the user-originating information database and mobile devices) stored in their respective mobile devices, and types and number of coupons held by the first and the second users may be stored in the user-originating information database and each information may be stored in different in accordance with the necessity of those skilled in the art who implement the present invention.

In addition, the user-originating information database may be configured to be included or separate from the server in accordance with the necessity of those skilled in the art who implement the present invention. In the present invention, the user-originating information database as a concept of including a computer-readable recording medium may include not only a narrow meaning of database but also a wide a broad meaning of database such as data record based on file systems. From the aspect, it may be understood that, even a set of logs may be included in the database part 240 in the present invention if it can be browsed and data can be extracted from the set.

Next, if the first mobile device 200 searches the second mobile device(s) 300 as a target to perform the specific interaction within a predetermined distance from the location of the first mobile device 200 or searches the second mobile device(s) connected to an AP or a base station of a cellular network to which the first mobile device 200 is connected and a specific second mobile device is selected among the searched second mobile device(s) and then a specified touch gesture is detected in the first mobile device 200, the interaction information collecting part 120 may perform a function of receiving the data related to the specific interaction from the second mobile device 300 or transmitting the data related to the specific interaction to the second mobile device 300. As described before, the data related to the specific interaction could include only the instruction data which instructs to be able to start the whole procedure of interaction. The update performing part 130 may perform a function of instructing the information originating from at least either of the first and the second users stored in the user-originating information database to be updated by referring to the data related to the specific interaction collected through the interaction information collecting part 120.

More specifically, if the data related to the interaction for making the first and the second users be SNS friends with each other is collected, the update performing part 130 may instruct a list of SNS friends of the first user or the second user to be updated by referring to collected information on the SNS account of the first user or the second user. In other words, it may instruct the second user to be added as a SNS friend in the list of SNS friends of the first user and the first user to be added as a SNS friend in the list of SNS friends of the second user.

If the data related to the interaction for a financial transaction is collected, the update performing part 130 may instruct the balance or the transactions of the financial account of at least either of the first user and the second user to be updated by referring to the transaction amount and the information on the financial accounts of the first user and the second user. Herein, the financial account information may include information on financial account number, balance, etc. For example, if the interaction for making USD 10 paid from the first user to the second user is performed, the update performing part 130 may instruct the balance of the financial account of the first user to be the amount subtracting USD 10 and instruct that of the second user to be the amount increasing USD 10.

If data on a business card is collected, the update performing part 130 may instruct the address book of at least either of the first user and the second user to be updated. For example, if the interaction for making the name card of the first user transmitted from the first user to the second user is performed, the update performing part 130 may instruct the list of the first user to be added in the address book of the second user stored in the user-originating information database and instruct the address book stored in the second mobile device 300 to be updated together by interacting the mobile device 300 of the second user and the user-originating information database with each other.

Lastly, if information on a coupon as the data related to the specific interaction is collected, the update performing part 130 may instruct information on the coupon of at least of the first user and the second user to be updated. For example, if the interaction for making the coupon transmitted from the first user to the second user is performed, the update performing part 130 may instruct the number of coupons held by the second user to be increased and, at the same time, instruct the number of coupons held by the first user to be reduced, as the case may be.

The application providing part 140 may perform a function of providing an application capable of providing interfacing service which relates to a user-originating information and changing the user-originating information to the first mobile device 200 and the second mobile device 300. By referring to the information on the application program installed or run in the first mobile device 200 and the second mobile device 300, it has been said above that the first mobile device 200 may search and select the specific second mobile device 300 of the second user as the target to perform the specific interaction. The application providing part 140 may be configured to be included in, or separate from, the server in accordance with the necessity of those skilled in the art who implement the present invention.

Next, the communication part 150 may perform a function of allowing data from and/or to the database accessing part 110, the interaction information collecting part 120, the update performing part 130, the application providing part 140, and the user-originating information database to be transmitted and received.

Lastly, the control part 160 may perform a function of controlling data flow among the database accessing part 110, the interaction information collecting part 120, the update performing part 130, the application providing part 140, and the communication part 150. In other words, the control part 160 may control the flow of data from/to outside or among the components of the server 100 and thereby allow the database accessing part 110, the interaction information collecting part 120, the update performing part 130, the application providing part 140, and the communication part 150 to perform their unique functions.

The present invention may bring the effect of easily searching the mobile device of the other user which can perform the interaction with the user.

In accordance with the present invention, if the gesture of swiping the image displayed on the mobile device is detected as the specified touch gesture, the effect of simplifying the course of the interaction with the other user by using the mobile device may be achieved by updating the information originating from the user which is related to the other.

In accordance with the present invention, if an interaction for making the user and the other user become SNS friends is performed, when the application installed in both the mobile devices of the user and the other user is turned on, the interaction becomes possible as well. At the state, because the user and the other user may become SNS friends with each other by simple swipe gesture, the cumbersome procedures, including searching the other user under the name of the other user on SNS, selecting a person who corresponds to the other user among the searched persons with the same name, and sending a friend request, may be omitted. The effect of performing an interaction intuitively may be achieved.

In accordance with the present invention, if the financial transaction is performed between the user and the other user, when the application installed in the mobile devices is turned on, the interaction becomes possible between the mobile devices. At the state, just with the simple swipe gesture (even though both mobile devices are not physically contacted or nearly contacted), the effect of financial transactions between the user and the other user may be achieved. The mobile device of the user or the other user may be used as a point-of-sale (POS) terminal or as a device exclusive for POS. In both cases, all the mobile devices may play roles to activate financial transactions.

In accordance with the present invention, on assumption that a financial transaction in which the user opens the wallet, pulls out money corresponding to transaction amount, and pays the money to the other user and the other user opens the wallet, and puts the received money in it in real life is mimicked on the mobile device, by making the user's actions of opening the wallet and paying the other user the money equal to the transaction amount by pulling out from the wallet correspond to those of running a digital wallet app in the mobile device and sending the money to the other user through a fixed entry in the digital wallet app, e.g., sending the money to the other user by the swipe gesture, respectively and making the other user's actions of opening the wallet and putting the received money in the wallet correspond to those of opening the digital wallet app and depositing the received transaction amount to the other user's account in the other user's financial institute interacted with the other user's mobile device, the size of the artificial effort (load) generated at each stage while setting the number of actions for the financial transaction of the user and the other user to be equal may be reduced to achieve the financial transaction via the mobile device with minimum interruption. These may reduce the sense of difference of users who are familiar with real financial transactions in such financial transactions via mobile devices.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for automatically changing information originating from at least one of a first user and a second user by using a communication device, the method comprising steps of:
   (a) a first communication device of the first user searching for at least one second communication device of at least one second user as a target with which to perform a specific interaction within a predetermined distance therefrom or searching for at least one second communication device connected to an access point (AP), an ad-hoc network, or a base station of a cellular network to which the first communication device is connected;
   (a0) selecting at least one specific second communication device from among the searched at least one second communication device to change the user-originating information;
   (b) the first communication device transmitting to, or receiving from, the specific second communication device data related to a specific interaction, if a specified touch gesture is detected in the first communication device; and
   (c) at least one of the first and the second communication devices allowing a server to update the information originating from at least one of the first user and the second user stored in the server or a storage device interacted with the server by referring to the transmitted data related to the specific interaction,
   wherein the first communication device searches for the at least one second communication device based on whether the at least one second communication device has a certain application program that is related to the specific interaction, and
   wherein the first communication device selects the specific second communication device where the certain application is turned on in either the background or the foreground, if there are multiple second communication devices searched.

2. The method of claim 1, further comprising a step of acquiring information on the at least one second communication device by using one of the server, the AP, the ad-hoc network, or the base station of the cellular network and allowing the information on the at least one second communication device to be displayed on the first communication device.

3. The method of claim 1, further comprising a step of:
   (a1) supporting selection of the specific second communication device by allowing a list of the searched second communication devices to be displayed on the first communication device, if there are multiple communication devices searched.

4. The method of claim 3, wherein one of the second communication devices searched is selected by the first user.

5. The method of claim 1, wherein the step of (b) includes the step of checking whether the specified touch gesture is performed by the first user.

6. The method of claim 5, wherein whether the specified touch gesture is performed by the first user is checked by checking a fingerprint of the first user.

7. The method of claim 1, wherein the specific interaction within the predetermined distance is a direct wireless connection, and
   wherein the user-originating information is information on balances or transactions of at least one of the first user and the second user, and the data includes information on transaction amount and information on the financial account of at least one of the first user and the second user.

8. The method of claim 7, wherein, at the step of (c), at least one of the first communication device and the second communication device allows the server to update the information on the balance or the transactions of at least one of the first user and the second user stored in the server or a storage device interacted with the server by transmitting the data to the server.

9. The method of claim 1, wherein, if the user-originating information is information on balances or transactions of at least one of the first user and the second user, the data is a signal indicating an intention that the first user and the second user want to perform the financial transaction.

10. The method of claim 9, wherein, at the step of (c), if the signal indicating the intention is transmitted between the first communication device and the second communication device, at least one of the first communication device and the second communication device allows the server to update the information on the balance or the transactions of at least one of the first user and the second user stored in the server or a storage device interacted with the server by transmitting the data to the server.

11. The method of claim 1, wherein, if the user-originating information is information on a list of SNS friends, the data includes information on an SNS account of at least one of the first user and the second user or a signal indicating the intention to update the information on the list of SNS friends.

12. The method of claim 11, wherein, at the step of (c), at least one of the first communication device and the second communication device allows the server to update the information on the list of SNS friends stored in the server or a storage device interacted with the server by transmitting information on an SNS account of at least one of the first user and the second user to the server.

13. The method of claim 1, wherein the touch gesture corresponding to the data is a gesture of swiping an image displayed on the first communication device in a first direction.

14. The method of claim 13, wherein the image is at least one of an image of currency, an SNS friend request-related image, an image of a business card, and an image of a coupon.

15. The method of claim 1, further comprising a step of:
(b0) detecting the touch gesture entered in the second communication device as a signal of transmitting and receiving the data, wherein the step of (b0) comes after the step of (b).

16. The method of claim 15, wherein the touch gesture corresponding to the data is a gesture of swiping the image displayed on the second communication device in a second direction.

17. The method of claim 15, wherein, at the step of (b0), if the signal of transmitting and receiving the data is detected, the step of (c) is performed.

18. The method of claim 1, further comprising a step of:
setting a wireless connection between the first communication device and the second communication device.

19. The method of claim 1, further comprising the step of:
(a2) directly connecting the first communication device with the at least one specific second communication device.

* * * * *